United States Patent
Offredi et al.

(10) Patent No.: US 11,479,342 B2
(45) Date of Patent: *Oct. 25, 2022

(54) EMERGENCY CONTROL OF AN AIRCRAFT

(71) Applicant: BAE SYSTEMS plc, London (GB)

(72) Inventors: Matthew Frank Offredi, Rochester (GB); Clive David Goodchild, Rochester (GB)

(73) Assignee: BAE SYSTEMS PLC, London (GB)

( * ) Notice: Subject to any disclaimer, the term of this patent is extended or adjusted under 35 U.S.C. 154(b) by 126 days.

This patent is subject to a terminal disclaimer.

(21) Appl. No.: 16/984,341

(22) Filed: Aug. 4, 2020

(65) Prior Publication Data

US 2020/0361595 A1 Nov. 19, 2020

Related U.S. Application Data

(63) Continuation of application No. 15/767,540, filed as application No. PCT/GB2016/053225 on Oct. 18, 2016, now Pat. No. 10,766,605.

(30) Foreign Application Priority Data

Oct. 19, 2015 (GB) ..................................... 1518435

(51) Int. Cl.
*B64C 13/18* (2006.01)
*G06F 19/00* (2018.01)
(Continued)

(52) U.S. Cl.
CPC .............. *B64C 13/18* (2013.01); *B64C 13/22* (2013.01); *B64D 11/00* (2013.01);
(Continued)

(58) Field of Classification Search
CPC ......... B64C 13/18; B64C 13/22; G06F 19/00; G05D 1/06; G05D 1/10; G05D 1/00;
(Continued)

(56) References Cited

U.S. PATENT DOCUMENTS 6,507,776 B1 * 1/2003 Fox, III ............... G05D 1/0055
701/11
6,739,556 B1 * 5/2004 Langston ........... B64D 45/0015
244/189

(Continued)

FOREIGN PATENT DOCUMENTS

| CA | 2244030 A1 * | 2/1999 | ............... B60T 7/22 |
| EP | 1422680 A2 | 5/2004 | |

(Continued)

OTHER PUBLICATIONS

GB Search Report under Section 17(5) received for GB Application No. 1518435.1 dated Mar. 18, 2016. 2 pages, Filed with U.S. Appl. No. 15/767,540.

(Continued)

*Primary Examiner* — Yuri Kan
(74) *Attorney, Agent, or Firm* — Finch & Maloney PLLC

(57) ABSTRACT

An aircraft emergency control system comprises at least one sensor configured to output an electronic signal relating to detection of incapacitation of at least one aircraft crew member. A processor is configured to receive and process the electronic signal to determine whether emergency action is to be taken. A control unit is configured to communicate, in use, a control signal to an avionics system of the aircraft in relation to the emergency action if the processor determines that emergency action is to be taken.

20 Claims, 5 Drawing Sheets

(51) Int. Cl.
  *G05D 1/00* (2006.01)
  *B64D 11/00* (2006.01)
  *B64D 45/00* (2006.01)
  *G06T 7/246* (2017.01)
  *B64C 13/22* (2006.01)
  *G08G 5/00* (2006.01)
  *G10L 25/48* (2013.01)

(52) U.S. Cl.
  CPC ..... *B64D 45/0034* (2019.08); *B64D 45/0056* (2019.08); *G05D 1/0061* (2013.01); *G06T 7/248* (2017.01); *G08G 5/0013* (2013.01); *G08G 5/0056* (2013.01); *G10L 25/48* (2013.01)

(58) Field of Classification Search
  CPC ....... G05D 1/105; H04M 11/04; G06Q 40/08; G06Q 10/00; G06T 7/248; G08G 5/00; B64D 25/00; B60T 7/22
  See application file for complete search history.

(56) References Cited

U.S. PATENT DOCUMENTS

| | | | |
|---|---|---|---|
| 7,142,971 B2 | 11/2006 | Brown et al. | |
| 9,232,040 B2* | 1/2016 | Barash | G16H 40/20 |
| 10,115,164 B1* | 10/2018 | Binion | B60W 40/08 |
| 10,766,605 B2* | 9/2020 | Offredi | G06T 7/248 |
| 2003/0034902 A1 | 2/2003 | Dickau | |
| 2003/0068044 A1 | 4/2003 | Nikolsky | |
| 2004/0260470 A1* | 12/2004 | Rast | G06Q 10/083 |
| | | | 701/300 |
| 2009/0179114 A1 | 7/2009 | Conner | |
| 2010/0004803 A1* | 1/2010 | Manfredi | B64D 25/00 |
| | | | 701/14 |
| 2011/0118912 A1* | 5/2011 | Shuster | G05D 1/105 |
| | | | 701/18 |
| 2012/0116610 A1 | 5/2012 | Righi et al. | |
| 2015/0251771 A1 | 9/2015 | Whitlow et al. | |

FOREIGN PATENT DOCUMENTS

| | | |
|---|---|---|
| EP | 2635941 B1 | 9/2013 |
| EP | 2916309 A1 | 9/2015 |
| WO | 2004025600 A1 | 3/2004 |
| WO | 2017068335 A1 | 4/2017 |

OTHER PUBLICATIONS

International Search Report and Written Opinion received for PCT Application—PCT/GB2016/053225. Dated Jan. 4, 2017. 12 pages, Filed with U.S. Appl. No. 15/767,540.

International Preliminary Report on Patentability received for PCT Application PCT/GB2016/053225. Dated May 3, 2018. 8 pages, Filed with U.S. Appl. No. 15/767,540.

* cited by examiner

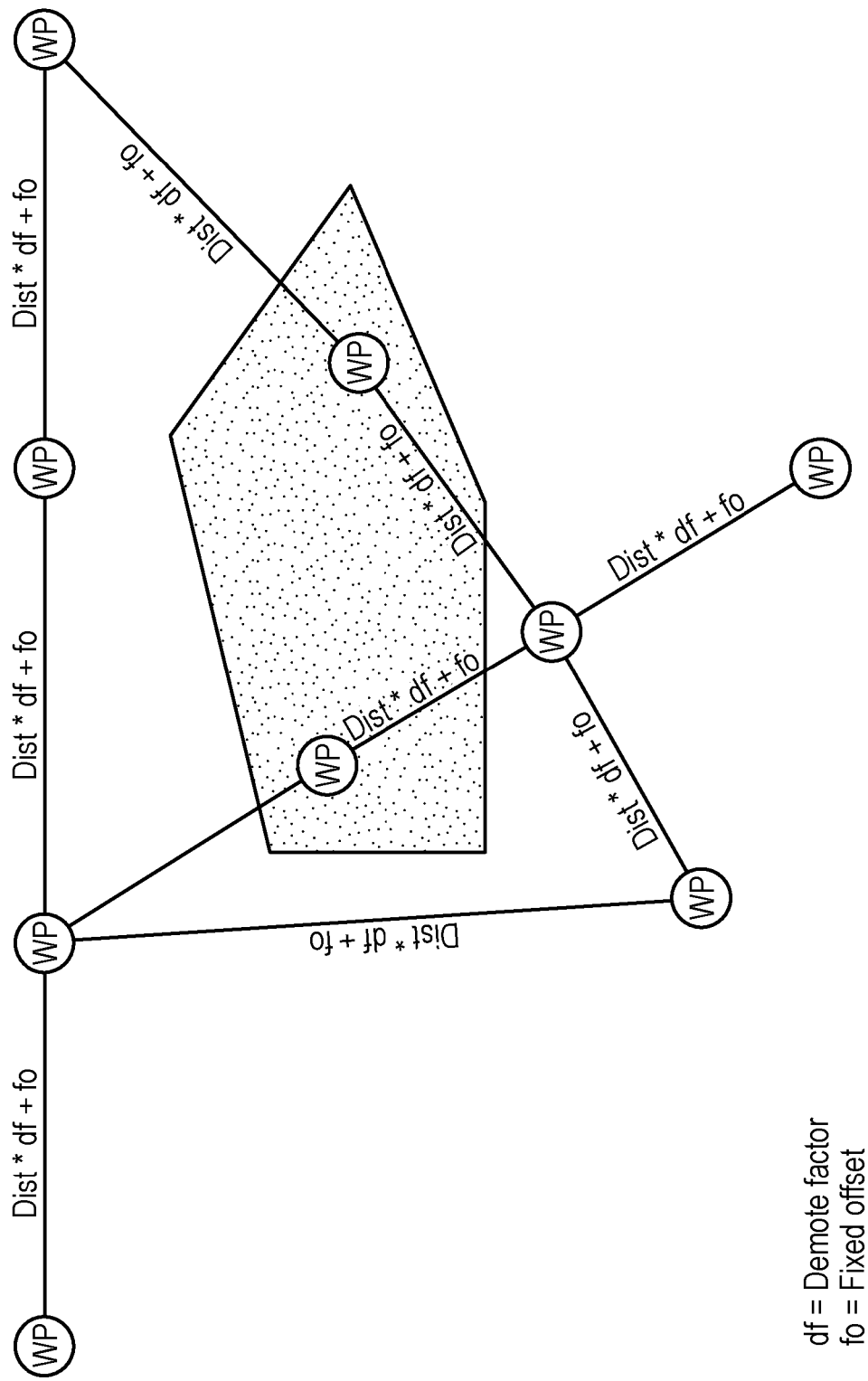

EMERGENCY CONTROL OF AN AIRCRAFT

RELATED APPLICATIONS

This application is a continuation of U.S. National Phase application Ser. No. 15/767,540, filed Apr. 11, 2018 titled "EMERGENCY CONTROL OF AN AIRCRAFT", which claims priority to PCT/GB2016/053225, filed Oct. 18, 2016, which in turn claims priority to GB 1518435.1, filed Oct. 19, 2015, the content of each of which is hereby incorporated by reference in its entirety.

BACKGROUND

The present invention relates to control of an aircraft, and particularly but not exclusively, to emergency control of an aircraft in the event of crew incapacitation.

In a multi-crew aircraft environment, incapacitation by one of the crew members may be obvious to other members immediately, and can become progressively more evident. Alternatively, the incapacitation could escape notice until there is an unexplained response, or until action is taken by another of the crew members. However, if all pilot(s) of a multi/single crew aircraft become(s) incapacitated then the safety of the flight will be severely compromised and loss of control likely.

A subtle incapacitation of one of two pilots could also present a similar risk, especially at low level and particularly if it occurs during a precision approach in low visibility procedures. Another consideration in the case of total crew incapacitation is loss of separation in the airspace, as well as flying into terrain or obstacles.

Previous work in this area has primarily considered the case where there has been a hijack of an aircraft, e.g. U.S. Pat. No. 7,142,971, which relates to a system and method for automatically controlling a path of travel of a vehicle. However, this and other solutions do not consider the case of total crew incapacitation, or how the aircraft would safely navigate a safe route and land.

SUMMARY

Embodiments of the present invention are intended to address at least some of the above technical problems. Embodiments of the solution disclosed herein can provide an Electronic Standby Pilot that will manage the aircraft functions to allow safe flight and landing in the case of total crew incapacitation under all weather conditions.

According to one aspect of the present invention there is provided an aircraft emergency control system, the system comprising:

at least one sensor configured to output an electronic signal relating to detection of incapacitation of at least one aircraft crew member;

a processor configured to receive and process the electronic signal to determine whether emergency action is to be taken, and a control unit configured to communicate, in use, a control signal to an avionics system of the aircraft in relation to the emergency action if the processor determines that emergency action is to be taken.

The at least one sensor may comprise an imaging device. The processor may be configured to analyse images encoded in the electronic signals of the imaging device in order to detect movement of the at least one crew member, and determine that the emergency action is to be taken if no said movement is detected during a predetermined period of time.

The at least one sensor may comprise an audio device. The processor may be configured to analyse audio data encoded in the electronic signals of the audio device, and determine that the emergency action is to be taken if no said audio data indicating speech and/or movement of the at least one crew member is detected during a predetermined period of time.

The at least one sensor may provide a said electronic signal representing operation of at least one controller of the aircraft by the at least one crew member. The processor may be configured to determine that the emergency action is to be taken if the electronic signals indicate that the at least one controller has not been operated over a predetermined period of time.

The control unit may transmit control signals to stabilise the aircraft and/or to perform bad weather avoidance.

The processor may be configured to generate an emergency route for flying the aircraft to an emergency destination airport. The system may, in use, transfer data relating to the emergency route to a Flight Management System of the aircraft. The system may, in use, use an auto-pilot system of the aircraft to implement the emergency route.

The system may further comprise a communications interface configured to establish an authenticated communications link with a remote station. The system may, in use, transfer data relating to the emergency route to the remote station. The system may be operable in:

a first mode wherein the system is able to generate or modify the emergency route without support from the remote station and controls the aircraft to implement the emergency route, and/or the system is able to allow an authenticated onboard crew member to regain manual control of the aircraft from the system, or a second mode wherein input from the remote station is required for generation or modification of the emergency route and to allow the system to implement the emergency route, and/or input from the remote station is required to allow an authenticated onboard crew member to regain manual control of the aircraft from the system.

A said emergency route generated by the system and/or the remote station may be restricted to follow officially recognised airways and/or follow altitude and speed constraints of the officially recognised airways.

The system may be configured, in use, to load a said emergency route generated or modified by the remote station into a Flight Management System of the aircraft. If the link between the system and the ground station is active in use then the system may be disabled from modifying the loaded emergency route. If the link between the system and the ground station is lost in use then the system may be enabled to modify the loaded emergency route, e.g. following expiry of a safety time-out timer.

The system (and/or the ground station) may be configured to generate the emergency route by:

generating a plurality of potential emergency routes;

assigning scores to each of the plurality of potential emergency routes, and selecting one of the plurality of potential emergency routes for implementation based on the assigned scores.

The step of assigning the scores to the emergency routes may comprise:

applying a demotion or promotion factor to at least one section of a said route based on at least one factor, wherein the at least one factor is selected from a set comprising: distance; flying altitude constraints; weather conditions; suitability in terms of aircraft fuel levels; collision risk; destination airport features, and/or destination airport runway features.

The method may further include:

generating data representing 3D coordinates of the sections of a said emergency route;

generating a 3D polygon representing an obstacle and/or weather condition, and processing the data representing 3D coordinates of the sections of a said emergency route and the 3D polygon to compute a said score for the emergency route.

According to another aspect of the present invention there is provided an (computer-implemented) aircraft emergency control method, the method comprising:

receiving an electronic signal relating to detection of incapacitation of at least one aircraft crew member;

processing the electronic signal to determine whether emergency action is to be taken, and if the processing determines that emergency action is to be taken then communicating, in use, a control signal to an avionics system of the aircraft in relation to the emergency action.

If the processing determines that emergency action is to be taken then the method may further comprise starting a timer for receiving a user input to prevent the sending of the control signal to the avionics system. A duration of the timer may be related to an altitude of the aircraft.

The method may further comprise transmitting a mayday signal indicating that the at least one crew member has been incapacitated. The method may comprise disabling manual control of the aircraft while the at least one crew member is determined to be incapacitated. The method may comprise re-enabling manual control of the aircraft upon receipt of control regain signals from a remote station over an authenticated communications link.

According to a further aspect of the present invention there is provided an aircraft including a system substantially as described herein.

According to a further aspect of the present invention there is provided a station configured to exchange data with a system substantially as described herein.

The station may be configured to store a said emergency route in a secondary data store during emergency route generation and store the emergency route in a primary database when the emergency route is determined to be safe for transfer to the aircraft.

According to yet another aspect of the present invention there is provided an emergency system comprising a system and a station substantially as described herein.

According to another aspect of the present invention there is provided apparatus configured for emergency control of an aircraft, the apparatus comprising:

at least one receiver for receiving an electronic signal relating to detection of incapacitation of at least one aircraft crew member;

a processor configured to receive and process the electronic signal to determine whether emergency action is to be taken, and a control unit configured to communicate, in use, a control signal to an avionics system of the aircraft in relation to the emergency action if the processor determines that emergency action is to be taken.

According to yet another aspect of the invention there is provided a method of (and system configured for) controlling flight and, optionally, safe landing of an aircraft in the event of crew incapacitation, the method comprising at least some of the following steps: detection of crew incapacitation through monitoring the crew responses from two or more independent and functionally different sensors; engaging automatic control of the vehicle after the crew has not responded to an alert after a pre-determined time interval based on the safe attitude of the vehicle; disabling any manual control of the aircraft while the crew is still determined to be in an incapacitated state; initiating a mayday signal that the crew has been incapacitated; controlling safe flight operation and navigation through the airspace via an incapacitation flight safety manager (the Electronic Standby Pilot), which automatically negotiates the flight plan with the ground systems, before initiating the controlled landing of the aircraft at a predetermined optimum landing setting and then bringing the aircraft to a halt on the landing surface.

The ESP may establish, via a communication function, a trusted link with a ground system to allow the ground system to have strategic control of the aircraft by providing amended flight plans via the ESP that are on the navigation system, that follow the altitude and speed constraints of the airways.

The ESP may be activated by establishing via the communication function a trusted link with a ground system to receive and check amended flight plans that are on the navigation system, and plans that follow the altitude and speed constraints of the airways and/or which can provide on board strategic control of the aircraft.

The ESP may be activated and be prevented from establishing a trusted link with a ground system, and may calculate and activate a new route that is on the on board navigation system that follows the weather, altitude and speed constraints of the airways and the fuel limitations of the aircraft.

The ESP may pass control back to the crew if an authenticated crew member interacts though one of the cockpit or flightdeck systems (e.g. via a non simplex system) to disengage the ESP and regain control of the aircraft. A crew member can be authenticated, for example, by entering a suitable password or using a physical device, such as a key, in connection with the ESP. If the ESP is operating without support from the ground station then this regaining of manual control may be done through a menu system, or the like, of the ESP. However, if the ESP is operating with support from the ground station then the regaining of control will be a controlled handover, e.g. similar in methodology to how a pilot transfers controls to the co-pilot or resting pilot.

The ESP may check that the route is within the limits of the navigation database and the current state of the aircraft. The ESP may not override a trusted ground system loaded link. If the trusted ground system communication link is lost then the ESP will remain in ground system mode for a ground system link lost timeout period and will establish full ESP control if that timeout period is exceeded. The ESP may calculate the optimum route by using at least one of: a navigation database; demotion factors to demote/promote airways; 3-dimensional polygons to represent demoted/hazardous airspace, and/or use of aircraft endurance.

The ESP may calculate an optimum destination airport by at least one of the following factors: checking for a minimum performance level to allow the aircraft to land at this runway (e.g. Instrument Landing System (ILS) precision approach, minimum allowed runway length, etc), even if preselected; original destination; good support services as an airport rating, and/or pre-down selected preferred airports which can be updated by a ground station.

The ESP may not change the route loaded in the navigation system unless its route rating/scoring is suitably better than the existing route by an aircraft-defined percentage factor and/or a fixed value factor, e.g. 20% better with at least reduction of route distance/score of 100 nautical miles. The ESP may hand over temporary control to collision avoidance and aircraft recovery systems and regain control when the aircraft has stabilised. Collision avoidance may use FMS commands for altitude control. A Traffic Collision Avoidance System (TCAS) may be aware of the aircraft's state and negotiation will attempt aircraft avoidance by a preferred altitude level. Aircraft State (ESP active duration/speed/direction/altitude/GS link state) and intent (route/final destination) may be relayed via existing aircraft systems. For example, ADS-B to allow increased separation and awareness from other aircraft, and can also allow other aircraft to cross check with ESP aircraft. This can reduce collision risk and allow other aircraft to report their intent to ATC and the ground station via voice or data communication in order to support the ESP if no link to the ground station is present and warn other close aircraft.

According to yet another aspect there is provided a method of aircraft route generation comprising:
generating a plurality of potential routes;
assigning scores to each of the plurality of potential routes, and
selecting one of the plurality of potential routes for implementation based on the assigned scores.

According to yet another aspect of the present invention there is provided an (method of establishing an) authenticated communications link between an aircraft and a remote station substantially as described herein.

According to another aspect, the present invention provides apparatus including a processor configured to operate methods substantially as described herein.

According to further aspects of the present invention there are provided computer-readable storage medium including instructions that, when executed on a processor, causes the processor to perform methods substantially as described herein.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1:
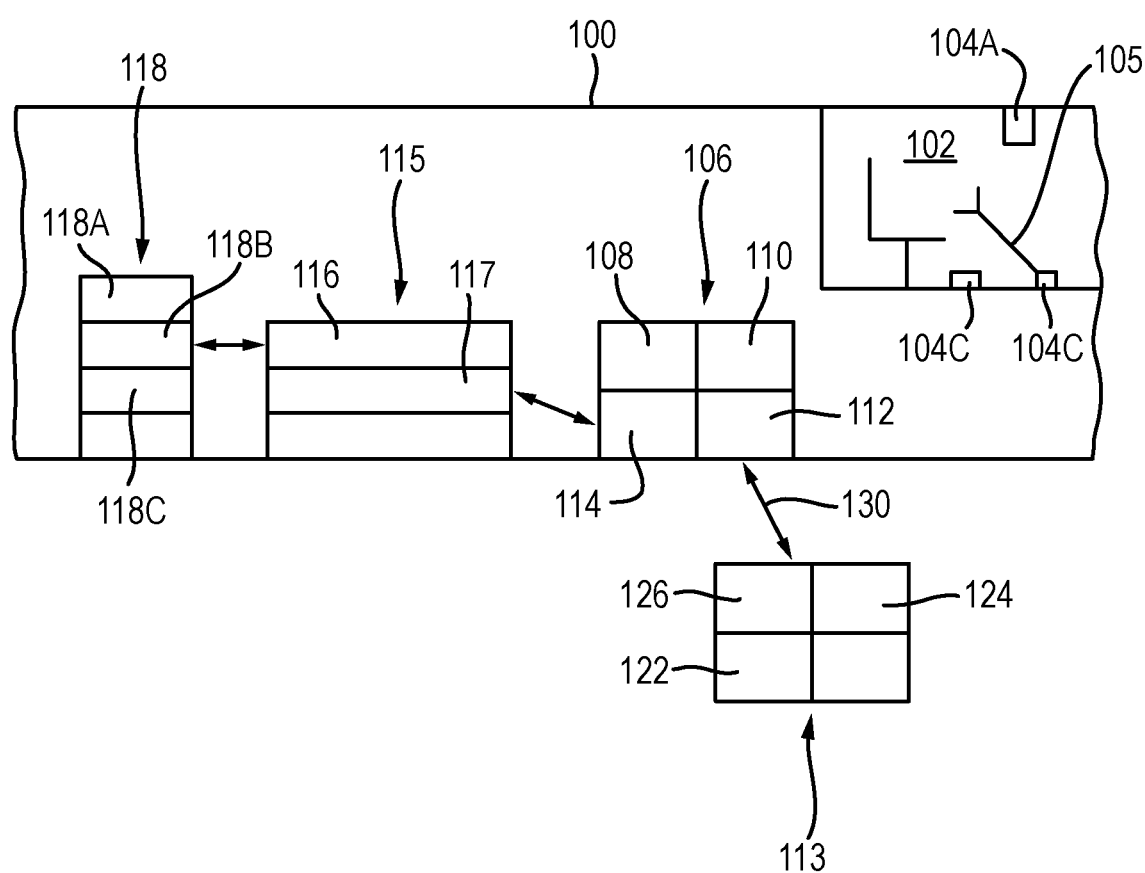
FIG. 1 schematically illustrates an aircraft including an embodiment of the emergency control system in communication with a ground station.

FIG. 1 schematically shows part of an example aircraft 100. The aircraft will typically comprise an aeroplane, although other types of manned aircraft, such as helicopters, are not excluded. The example aircraft includes a cabin 102, where at least one crew member is normally stationed in order to control and/or oversee fight/operation of the aircraft. In the example aircraft the cabin is typically occupied by two pilots.

Embodiments of the emergency control system can comprise at least one sensor that can provide an electronic signal to an Electronic Standby Pilot (ESP) device 106. The ESP device 106 can comprise a computing device that includes a processor 108, memory 110, communication interface 112 and a control unit 114. In some cases the device 106 may be a stand-alone/special purpose computing device, or it may be part of at least one other component of the aircraft, e.g. partially integrated into an auto-pilot system of the aircraft. The communications interface can exchange data with remote devices over various types of wired or wireless links.

The control unit 114 of the ESP device 106 can be in communication with avionics components 115 of the aircraft 100, such as a Flight Management System (FMS) 117 and an auto-pilot system 116 (these are non-limiting examples). The ESP device can transfer control signals to such components and may also receive data/signals from them. The auto-pilot system can control the aircraft's flight control system 118, which typically includes components/subsystems such as flaps, 118A, gears 118B, brakes 118C, etc. The functioning and construction of aircraft components, such as the auto-pilot and the flight control system, will be known to the skilled person and need not be described herein in detail. It will also be appreciated that the illustrated positioning and arrangement of components of the emergency control system in relation to other aircraft systems/components are exemplary only and many variations are possible. In practice, components of the emergency control system may be installed in an aircraft (or in aircraft component(s)) during manufacture, or may be retro-fitted to existing aircrafts/components.

A first example sensor 104A comprises an imaging device, such as a still or video camera. A second example sensor 104B comprises an audio device, such as a recording device or microphone. As another example, a sensor 104C may be located in (or be in communication with) a controller, e.g. joystick 105 or any other component with which a crew member interacts. This sensor may generate an electronic signal every time the controller is operated by a crew member. Although the sensors are shown positioned within the cabin 102 in the example, it will be understood that this does not necessarily need to be the case. It should also be understood that these sensors are merely examples and other types may be provided with the intention of generating electronic signals that can be used to detect incapacitation of at least one aircraft crew member. In preferred embodiments there are at least two independent and functionally different sensors, which can improve the accuracy of detection and avoid false alarms.

The communications interface 112 of the ESP device 106 is shown in communication with a remote station 113. The remote station will typically be at a fixed ground location, although variations are possible, e.g. it could be located on board another aircraft, or a sea or land-based vehicle, or it may be a portable device carried by a user. Its components could also be geographically distributed. The remote station includes a computing device 120 that includes a processor 122, memory 124 and a communications interface 126. The communications interface is capable of establishing a trusted link 130 for communication with the communications interface of the ESP device, and can also communicate via other communications links with other local or remote devices/data stores (not shown). The ground station system will typically be operated by an airline pilot, or other person(s)

having the experience required to understand the emergency situation and communicate with the ESP device.

In operation, embodiments of the aircraft emergency control system are intended to control the flight and safe landing of the aircraft 100 in the case of crew incapacitation. If the aircraft is at an unsafe attitude then it can initiate auto-recovery to a safe attitude. The ESP device 106 can receive electronic signals from the at least one sensor 104A-104C and process these to determine whether at least one crew member (typically all relevant/crucial crew members, such as the pilot(s) stationed in the cabin 102) has/have been incapacitated for some reason. The electronic signals can have any suitable format and content, and may be transferred via wired or wireless channels using any appropriate protocol(s), network(s), etc.

Figure 2:
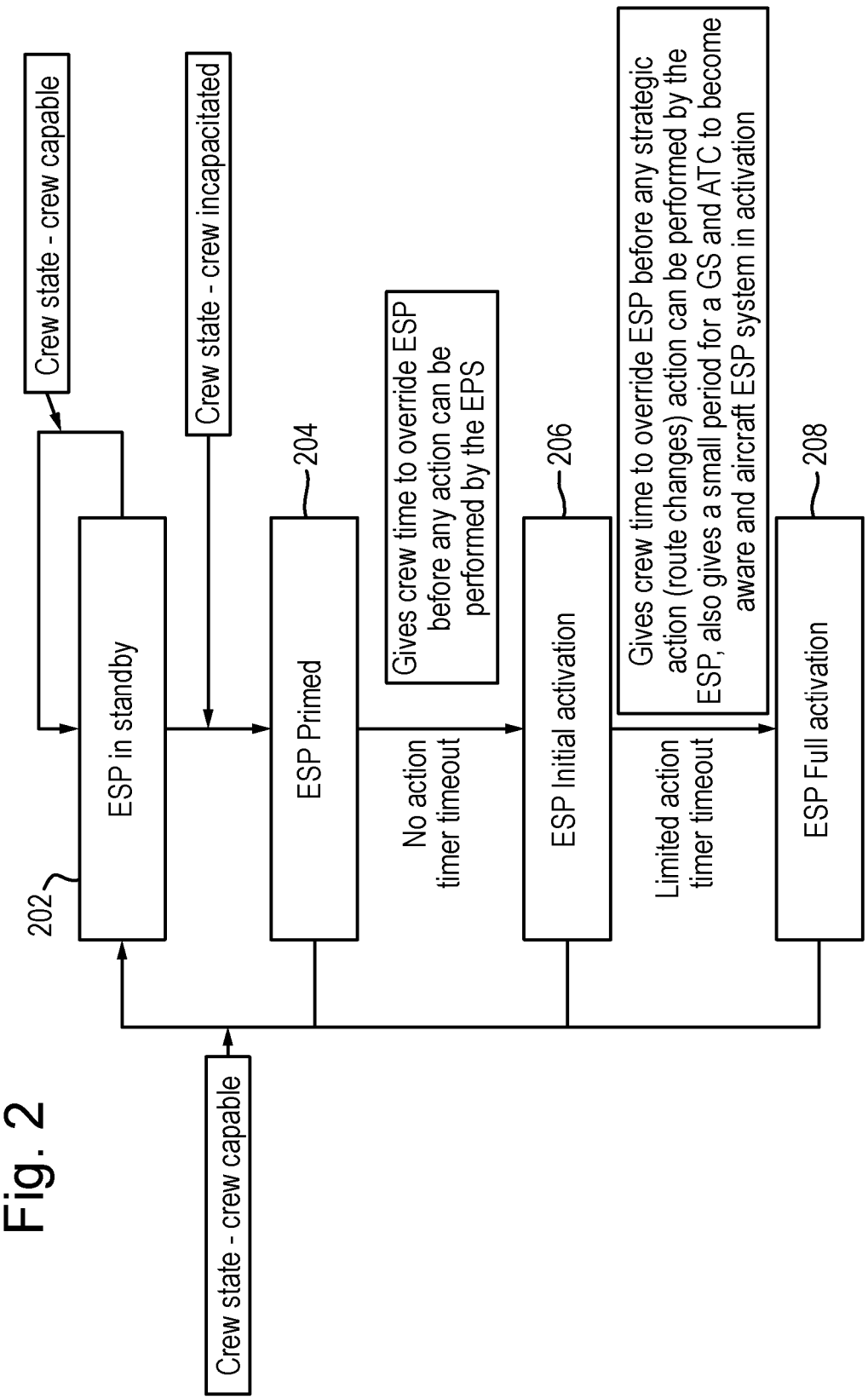
FIG. 2 is a flowchart illustrating example operation of the emergency control system.

FIG. 2 is a flowchart showing an overview of example operation of the system. The operations may be at least partially implemented by means of code executing on at least one computer device, such as the ESP device 106 of FIG. 1. It will be appreciated that the flowcharts/diagrams shown herein are exemplary only and at least some of the illustrated steps may be re-ordered or omitted. Also, additional steps may be performed. Further, although steps are shown as being performed in sequence, some could be executed concurrently in alternative embodiments. The steps may be performed by the same, or different, processors/devices. The skilled person will also appreciate that the operations described herein can be implemented using any suitable programming language/means and data structures.

At step 202, the ESP device 106 is in a standby mode, where normal control of the aircraft 100, e.g. by the pilot(s) and/or auto-pilot system 116, is taking place. During this standby mode, the ESP device continuously (or intermittently, or on an event basis, or on-demand basis) performs determinations as to whether at least one crew member is incapacitated. This determination will be based on processing information provided by the at least one sensor 104A-104C. The ESP device may only change to a primed mode if signals received from at least two (functionally different) sensors indicate that incapacitation has taken place. Weighting or prioritisation may be applied to some of sensors or certain combinations of sensors/electronic signals.

For instance, with regards to the imaging device sensor 104A, the ESP device 106 can analyse images encoded in the electronic signals of the imaging device in order to detect movement of the at least one crew member, e.g. using known image processing/comparison techniques. The processor of the ESP device may determine that it needs to change from the standby mode to a primed mode if no movement is detected, e.g. no substantial change in a part of the image recognised as a crew member, over a predetermined period of time and/or over predetermined number of image frames. The skilled person will appreciate that the period of time can vary, e.g. from one minute to several minutes. Also, the predetermined period of time may change based on various factors; for instance, it may be shorter when it is expected that a pilot will move more frequently, e.g. when preparing for a landing operation.

With regards to the audio device/microphone sensor 104B, the ESP device 106 may analyse the audio data encoded in the electronic signals, and determine that it needs to change from the standby mode to the primed mode if no said audio data indicating speech and/or movement of the at least one crew member is detected during a predetermined period of time. Again, it will be understood that the details of this determining/processing can vary; for instance, the process may be able to distinguish speech originating in the cabin as opposed to speech being received from elsewhere (e.g. via a radio link); the process may cancel out engine noise or other ambient sounds; it may be triggered (or increased in sensitivity, and/or reduce the predetermined period of time) when it is informed that there has been no response to an external communication attempt, etc.

With regards to the controller operation sensor 104C, the ESP device 106 may determine that it needs to change from the standby mode to the primed mode if, for example, it has not receive a signal indicating that the controller has been operated over a predetermined period of time. Again, it will be understood that the details of this determining/processing can vary; for instance, it may not be performed if is known that auto-pilot is currently operating, etc.

Typically, the ESP device 106 will process the electronic signals received from the at least one sensor 104 in order to perform the determination, although in some embodiments, the sensors may include (or be in communication with) a processor that performs the determination, and can then transfer an electronic signal indicating incapacitation (or non-incapacitation) to the ESP device, which performs further processing based on that received signal.

If the ESP device 106 enters the primed mode (step 204) then it can start a timer to give crew members an opportunity to prevent it from entering an initial activation mode. During the primed mode, normal operation of the aircraft 100 will continue to take place. However, the system may emit an internal warning signal (in the cabin 102 and/or elsewhere in the aircraft) in order to alert any available crew member(s) that incapacitation has been detected, and a timer may be started in order to allow any such crew member to prevent an initial activation mode from being entered. The duration of the timer can range from, say, 30 seconds to several minutes. In some embodiments, the duration of the timer may be based on at least one factor, such as the altitude of the aircraft (e.g. the higher the altitude, the longer the duration), the velocity of the aircraft, etc.

For safety, the system may include a special type of control to allow the crew member to prevent the initial activation mode from being entered, and/or to help avoid standby mode being re-entered accidentally. For example, the control may comprise a "break glass to access" type protected button/switch; a key-activated switch, or requiring an appropriate security code to be entered onto a computer terminal. If the prevention action is taken then ESP device 106 can return to the standby mode 202. If the prevention action is not taken and the timer reaches the predetermined time-out period then the system enters the initial activation mode. Information regarding mode changes may be stored by the system and/or transferred to a remote device for (future) analysis. Further, if during any mode, a signal is received indicating that the at least one crew member is no longer incapacitated (or has been safely replaced) then the system may re-enter the standby mode.

If the ESP device 106 enters the initial activation mode (step 206) then it begins the process of controlling flight operation of the aircraft 100. It may give any non-incapacitated crew member(s) a predetermined period of time to override it before any strategic action (e.g. route change) is performed. The ESP device may also offer a (typically short) period of time for a ground station and/or Air Traffic Controller to become aware of the situation, e.g. by transmitting warning signals. Other actions that may take place under the control of the ESP device in this mode include stabilising the aircraft (if required) and/or emergency avoidance of any short term hazards (e.g. traffic, weather and/or terrain). If no preventative action is taken in time then the emergency control system can enter full activation mode (step 208).

In the full activation mode the ESP device 106 may transmit a mayday signal indicating that the crew has been incapacitated, e.g. using a radio or other communication unit of the aircraft 100. The system can disable any manual control of the aircraft while the crew is still determined to be in an incapacitated state. Embodiments may also be capable of conducting weather avoidance. Embodiments of the system aim to control the flight operation of the aircraft and land at an airport. The selected airport can be negotiated with the ground station system 113 and a revised flight plan may be implemented. The ESP device may also bring the aircraft to a halt on the runway after landing. Instrument Landing System and/or visual cues from sensors on the aircraft may be used to maintain the aircraft on the runaway until the aircraft is brought to a halt. It can also control the shutdown of the engines after the aircraft has come to a halt.

A trusted link 130 between the ESP device 106 and the ground station 113 can be established. A high level of security is required for this communications link because the data that is transferred over it can be used to directly/indirectly control the aircraft 100. The link may be based on existing authenticated communications protocols, such as those used to communicate with Air Traffic Control, e.g. Controller Pilot Data Link Communications (CPDLC). It will be understood that various security/safety measures, e.g. encryption, interception prevention, checksums, etc. can be implemented in relation to the trusted link. It will also be appreciated that embodiments of this trusted link can be used in non-emergency situations for secure transfer of data.

In some embodiments, the ESP device 106 can generate an emergency route to an airport for emergency landing of the aircraft 100. In some embodiments, the ESP device may (alternatively or additionally) negotiate with, or receive data relating to a route/airport from, the ground station 113. However, the ESP device may be allowed divert the aircraft to its selected airport and land in the absence of confirmation/further instructions from the ground station, e.g. due to the trusted link 130 being lost due to atmospheric conditions, a technical fault, or other reason.

The routes generated by the ESP device 106 and/or the ground station 113 may be restricted to follow officially recognised airways, e.g. ones stored in the navigation system of the aircraft 100, and will also normally follow the altitude and speed constraints of the airways. This restricts the ESP device (and/or the ground station) so that arbitrary routes that could send the aircraft into non-controlled airspace are avoided, thereby reducing the chance of the aircraft leaving controlled airspace. In alternative embodiments, some steps (e.g. establishing the trusted link and/or calculating a proposed route) of the full activation mode as described herein may be performed (or at least prepared for) in the initial activation mode. The order of the steps performed in the various modes may also vary from the description herein.

Figure 3:
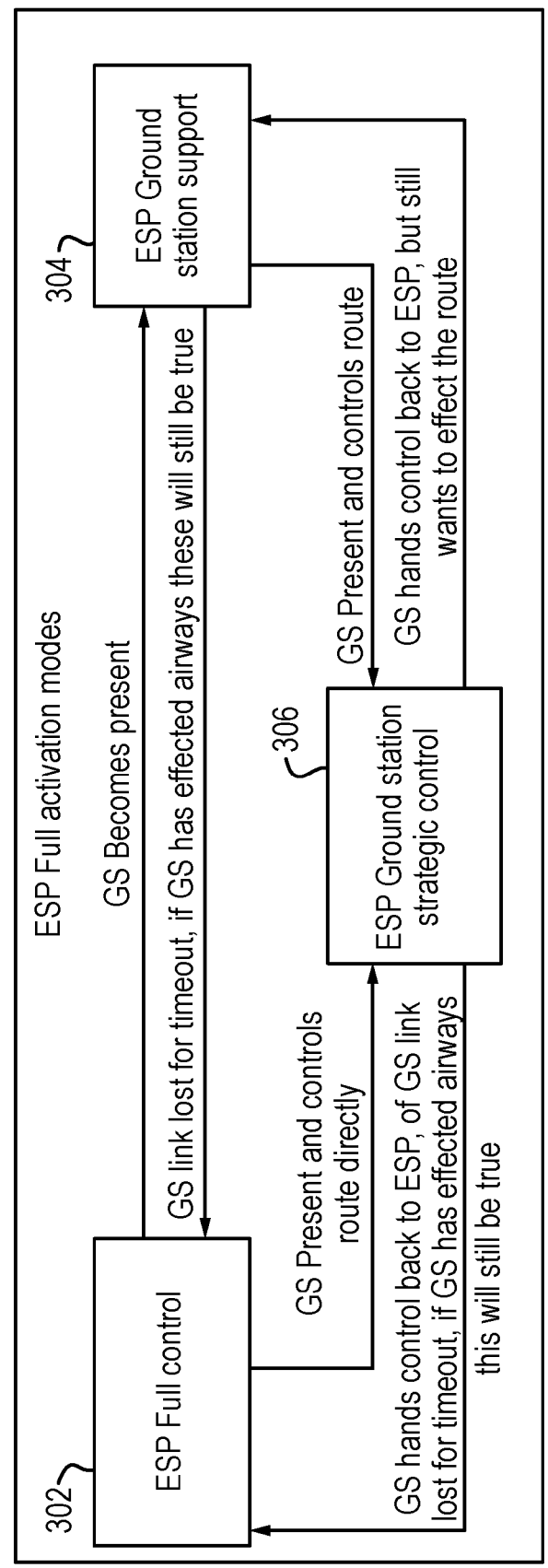
FIG. 3 details a full activation mode of the emergency control system.

FIG. 3 schematically illustrates how embodiments of the ESP device 106 can operate/be operated in one of three control modes during the full activation mode: ESP full control 302; ESP ground station support 304, or ESP ground station strategic control 306. Modes 304 and 306 usually need to be initiated by the user at the ground station 113. The user will need to be authenticated and has the authority to change the mode.

In the ESP full control mode 302, the ESP device 106 can calculate a new route without support from the ground station 113 and can activate/implement this route itself. However, if the trusted link 130 with the ground station 113 becomes, or is, active then mode 304 or 306 may be entered. In the full control mode a crew member may regain manual control of the aircraft 100 using a menu system, or the like, of the ESP 106. However, if the system is in mode 304 or 306 where the ESP device is operating in collaboration with the ground station then the regaining of control by an onboard crew member will be a controlled handover, e.g. similar in methodology to how a pilot transfers controls to the co-pilot or resting pilot.

In the ground station support mode 304, route-planning software executing on the ground station 113 (and/or a user of the ground station) can generate a route to be used by the aircraft, including controlling access to waypoints, runways and airways. The generated route may be initially based on a route provided to the ground station by the ESP device 106. The ground station may add a "via" waypoint to control the way a route is flown. It can also demote airways and runways in the route generation process by increasing the cost of traveling on them, as will be described below.

In the ESP Ground Station Strategic Control mode 306, the ground station 113 can load a route into the FMS 117 of the aircraft 100 via the ESP device 106. The ESP device can then check whether this route is acceptable (within the limitations of the FMS navigation database). When the trusted link 130 is present, the ESP device will not be able to override a route that has been loaded from the ground station. However, if the trusted link is lost then the ESP device will start a "link lost" timer. If this timer expires then the ESP device will return to the ESP full control mode 302. In some embodiments, any route calculated by the ESP device will need to be considered to be an improvement over a route loaded into the FMS by the ground station (e.g. the routes can be scored and the ESP device-generated route would have to beat the score of the existing route by a defined percentage or fixed value). This can ensure that the ESP device will not continually change the route. In some embodiments, the aircraft may also be controlled/flown remotely by a user at the ground station in this control mode.

Examples of the route/destination generation process will be described below. A general aim of the process is to have the aircraft land as soon and as safely as possible, although it will be appreciated that embodiments of the route/destination generation process may also be used in non-emergency situations (e.g. for calculating a detour from an originally-planned route). Embodiments of the process are typically implemented by software executing on the ESP device 106 and/or the ground station 113. In some cases these software components may communicate/negotiate with each other in order to generate and/or select a route/airport. Embodiments typically involve selecting a preferred destination airport (including a preferred runway in some cases) and a preferred route to reach that airport. Several potential routes/destinations may be generated and scores may be assigned to each. The ESP device 106 and/or the ground station 113 can use the scores to make selections. The scores can take into account various factors, including route distance, safety (e.g. based on altitude constraints), etc. and may be re-calculated due to changes relating to these factors.

The scoring of routes can involve allocating a score to section(s) (e.g. sections between the current/original position of the aircraft and the destination, taking into account any waypoints) of the route. In some embodiments this score can be promoted to give preference to the route and/or demoted in order to reduce the likelihood of the route being selected. Demoting can be done by a multiplier and/or by a fixed addition/offset. The fixed offset can be set high so the aircraft is very unlikely to take a particular route. For example, the fixed offset could be set to 1024. As the scoring of the routes in some embodiments is in arc distance, this would mean that to fly this route the route finder would treat this as flying almost 3 times around the globe. The ground station 113 can close routes and links to runways; however, a high score might be better because this means that all routes are still available, but weighted so as to be very undesirable. This means that the ground station should never block the ESP device 106 with a broken route.

Promotion of a route score can be by a factor of 1. In some embodiments a route can only be demoted and so routes will always look longer, never shorter, than the actual route distance. Fuel burn may be estimated and the system can calculate the Estimated Time of Arrival over all possible calculated routes (in some cases using information provided by the FMS). This can be done assuming the wind direction is constant throughout the flight. The system can calculate a simplified true flight speed based on the cruise speed of the aircraft with no wind and may use a look up table to apply a factor based on the wind direction with respect to each airway's azimuth. This will stop the abstracted airway score making the aircraft take a route that is not suitable based on fuel levels. The current FMS route will be considered possible if it stays on airways (this can be the basis of the initial route generated/provided by the ESP device). The skilled person will understand that these operations are exemplary only and variations are possible, e.g. any type of indicator(s)/value(s) could be used to indicate the likelihood of selection of a potential route.

In order to reduce the chance of an impact, where flight level rules offer 152 m (500 ft) vertical separation the system would follow these rules. In some cases the ESP device may determine that the aircraft should fly offering 76 m (250 ft) minimum vertical separation to interleave. It will be appreciated that these particular values are merely examples. Other aircraft can be made aware of the ESP controlled aircraft and may increase their own vertical separation.

If flying in oceanic tracks the system may adopt the emergency track route, flying with an increased horizontal separation. The aircraft may be able be able to divert across the tracks or turn around if these offered a better solution than continuing in the current direction. The risk to other aircraft can be assessed and ground station support may be required to allow the aircraft to cross the tracks. It is typically assumed that upon the ESP device 106 entering the full activation mode, the ground station 113 would be ready and responding within, e.g., 15 minutes to help guide the aircraft.

Embodiments of the system may ignore some flight restrictions, such as time limits on routes that stop aircraft flying over areas at night. However, generated routes may use demotion to keep the aircraft, where possible, flying over non-populated areas.

Embodiments of the ground station 113 can control a double buffered route score database. Once route generation is completed, the ground station can trigger the upload of the generated route to a prime database in order to stop incomplete data being uploaded to the ESP device 106. Thus, the ground station will not need to wait until all changes are loaded in order to trigger the upload. This is a precaution in case a single ground station airway update causes a hazard, and a few loads are required. It can also give the ground station a chance to check the data before transfer to the prime database. For safety/security, the airway score database can be protected using CRCs or the like.

Approach routes to runways that are suitable, but not preferred, can be demoted in order to guide the ESP device 106 to land at a preferred runway, e.g. one at an airport that has good emergency services and long runways (but not major airports that have demoted approach routes). The initial airport that could be selected may be limited to one of more of the following: CAT2 ILS or greater; long runways; large but not major airports; original destination and/or good support services.

Pre-flight, route demotion can restrict runway usage at airports and control approach routes to make the flight path selection as deterministic as possible. Routes with higher altitude restrictions will be demoted to reduce their use; in a typical situation the system may reduce altitude to FL100 (approximately 305 m (1000 ft)) to allow reduced risk of hypoxia. However, this may be limited by restrictions on the airway. If the airway is restricted (and as unrestricted airways are not demoted in this manner), the system would be very likely to move to an unrestricted airway and reduce altitude if this is possible.

The ground station 113 can know if ILS systems are not functioning at any airport, and this can affect the ground station's choice of airport. The ESP device 106 can access the ILS tuning function to also sense if the ILS is operational. A go around may be completed if no ILS is present.

Embodiments may use a weighting system to score airport suitability for emergency landing. Example factors are shown in the table below:

| Assessed parameter | Comment |
| --- | --- |
| ESP rating of the airport | ESP rating is a score of the airport for emergency landing |
| Aircraft status | Direction and speed |
| Distance to airport vs possible flight endurance | This would include avoiding hazards such as weather and no fly areas |
| If weather needs to be avoided | Weather pattern movement causing more disruption |
| Possible loss of ground station link on flight path | If communication could be lost on route |
| Weather at airport | Good weather: high score Low visibility: reduced score, even though this would not affect the aircraft's flight, it could be related to weather that can affect flight: low score |
| Fit to pre calculated ESP flight routes | Offline generated preferred ESP flight routes based on location of the aircraft, and possibly predicted weather conditions |

The system's rating of airports could be performed off line by an assessment team and based on airport data from an A424 database, possibly re-assessed on a periodic, e.g. annual, basis. The criteria for scoring could be based on this and it can also generate a preferred runway for landing at each airport. Example airport rating factors are shown in the table below:

| Assessed parameter | Comment |
| --- | --- |
| Auto land capability | If no auto land capability the scoring would be 0; this would mean if in ESP fully active mode a landing would not be possible Auto land category may be taken into account, e.g. cat 1, cat 3 |

| Assessed parameter | Comment |
|---|---|
| Busyness of airport | |
| Length of runway | |
| Emergency service availably | |
| Risk of high winds and changeable weather | |
| Local environment | Road links, high density urban could score less though due to risk of damage/traffic on routes |

An estimated airport selection table could be generated offline for regains of flight. This could be assessed by the ESP device on board the aircraft in use.

Embodiments of the route selection may take into account the remaining fuel of the aircraft. If the fuel level allows, the ESP device 106 may cause the aircraft to enter a holding pattern before attempting a landing in order to allow for ground station support before a landing is attempted. If fuel is/becomes low (still allowing for some contingency) and the ground station has not responded then the ESP device may attempt the landing. Having been in hold allows the ground station to respond, and runways to be cleared, etc. If needed, a Notice To Air Men may be monitored if the ground station link is not present in order to assist with determining if runways are clear for landing, possibly using ILS to help guide the ESP controlled aircraft.

Figure 4:
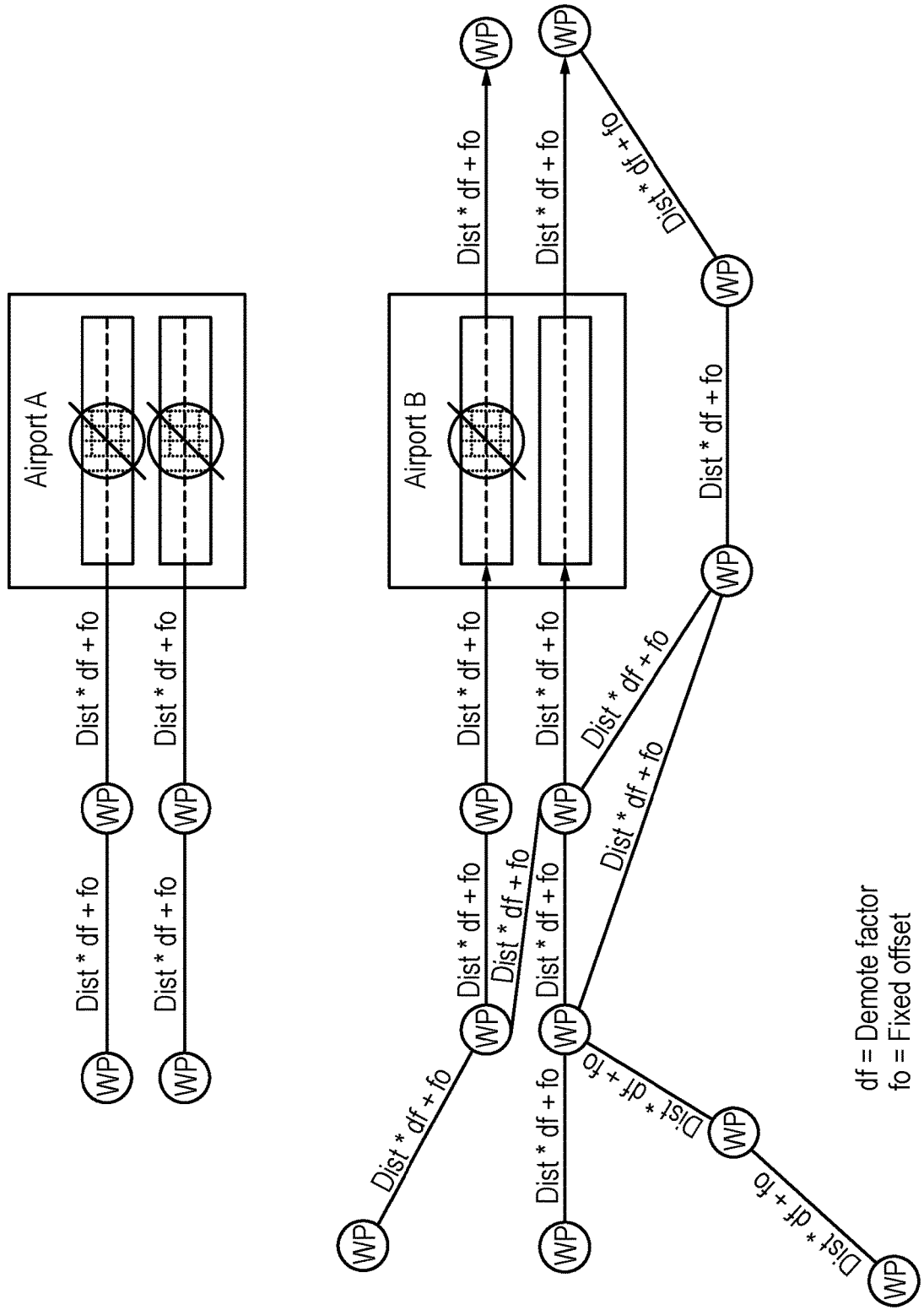
FIG. 4 graphically illustrates a route planning operation of the emergency control system, and FIG. 5 further graphically illustrates a route planning operation of the emergency control system.

FIG. 4 is a diagram that schematically illustrates how embodiments of the route generator can deal with a runway closure. Embodiments can stop the ESP device 106 from causing the aircraft 100 to land at less suitable runways; constrain the approach route; constrain a go around route, and/or communicate to the ESP device that an airport (e.g. Airport A of the Figure) is not useable at all.

FIG. 5 is a diagram that schematically illustrates how embodiments of the route generator can use route demotion polygon routes. Air routes can be represented using 3D coordinates. An adverse weather condition (or other type of obstacle or hazard) can also be represented using 3D coordinates. The skilled person will be familiar with the use of 3D polygons for modelling avionic weather maps and mapping of controlled/restricted airspace. The likelihood of selection of routes can be affected by scores assigned to coordinates of the polygon, e.g. a worse score can represent bad weather. The ground station 113 can affect route scores by affecting the multiplier or fixed offset based on overlap of coordinates of a route and the 3D polygon. The ground station will not be able to reduce the score multiplier below a value given by the polygon. The polygon only changes the multiplier by the amount the polygon covers of the section of the route. For example, for a route distance of 10, if the polygon has a score of 2 and covers 9.26 km (5 nm) then the effective score with a linear cover factor would be 15. The ground station can add a fixed offset to make a route very unattractive to the ESP device 106. The fixed offset may also be affected by altitude constraints for the link/route section. The ground station will not be able to adjust this below that given by the altitude constraint factor.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An aircraft emergency control system comprising:
   a processor configured to receive and process an electronic signal to determine that an emergency action is to be taken, and to select one of a plurality of emergency routes for flying the aircraft to an emergency landing destination; and
   a control unit configured to communicate a control signal to an avionics system of the aircraft in relation to the emergency action if the processor determines that the emergency action is to be taken.

2. The aircraft emergency control system according to claim 1, wherein the processor is further configured to detect at least one non-responsive aircraft crew member based on the electronic signal.

3. The aircraft emergency control system according to claim 1, wherein the processor is further configured to select the one of the plurality of emergency routes based on at least one score assigned to one or more of the plurality of emergency routes.

4. The aircraft emergency control system according to claim 1, wherein the aircraft emergency control system is configured to use an auto-pilot system of the aircraft to implement the selected one of the plurality of emergency routes.

5. The aircraft emergency control system according to claim 1, wherein the aircraft emergency control system further comprises a communications interface configured to establish an authenticated communications link with a remote station, and to transfer data relating to the selected one of the plurality of emergency routes to the remote station.

6. The aircraft emergency control system according to claim 5, wherein the aircraft emergency control system is operable in:
a first mode wherein the aircraft emergency control system is configured to generate or modify the selected one of the plurality of emergency routes without support from the remote station and to control the aircraft to implement the selected one of the plurality of emergency routes, and/or to allow an authenticated onboard crew member to regain manual control of the aircraft from the aircraft emergency control system; or
a second mode wherein input from the remote station is required for generation or modification of the selected one of the plurality of emergency routes and to allow the system to implement the selected one of the plurality of emergency routes, and/or input from the remote station is required to allow an authenticated onboard crew member to regain manual control of the aircraft from the aircraft emergency control system.

7. The aircraft emergency control system according to claim 5, wherein if the authenticated communications link between the aircraft emergency control system and the remote station is active in use then the aircraft emergency control system is disabled from modifying the selected one of the plurality of emergency routes, and if the authenticated communications link between the aircraft emergency control system and the remote station is lost in use, then the aircraft emergency control system is enabled to modify the selected emergency route.

8. The aircraft emergency control system according to claim 1, wherein the aircraft emergency control system is configured to generate a plurality of emergency routes by:
assigning a plurality of scores to each of a plurality of potential emergency routes; and
selecting one of the plurality of potential emergency routes based on the assigned scores.

9. The aircraft emergency control system according to claim 8, wherein assigning the scores to each of the plurality of potential emergency routes includes applying a demotion and/or a promotion factor to one or more sections of each of the plurality of potential emergency routes based on at least one factor, wherein the at least one factor includes distance, flying altitude constraints, weather conditions, suitability in terms of aircraft fuel levels, collision risk, destination features, and/or destination runway features.

10. The aircraft emergency control system according to claim 9, wherein the selected one of the plurality of emergency routes has a highest score assigned to each of a plurality of sections of each of the plurality of potential emergency routes.

11. The aircraft emergency control system according to claim 9, wherein at least one score is a function of a multiplier and/or fixed offset value based on overlap of coordinates of at least one section of the selected one of the plurality of emergency routes and coordinates of a 3D polygon.

12. An aircraft including the aircraft emergency control system according to claim 1.

13. A method of controlling flight of an aircraft, the method comprising:
engaging automatic control of the aircraft in response to detecting an event has occurred;
automatically negotiating an emergency flight plan with a ground system, the emergency flight plan including at least one landing setting; and
initiating a controlled landing of the aircraft at the at least one landing setting and bringing the aircraft to a halt on a landing surface without requiring pilot intervention.

14. The method of claim 13, wherein the detected event includes a failure of at least one aircraft crew member to respond to an alert within a pre-determined time interval.

15. The method of claim 13, wherein the detected event is crew incapacitation, the method further comprising:
detecting crew incapacitation through monitoring one or more aircraft crew member responses from two or more independent and functionally different sensors, the sensors indicating two or more of speech, movement, and engagement of airplane controls.

16. The method of claim 13, further comprising one or both of:
disabling a manual control of the aircraft while at least one aircraft crew member is determined to be in an incapacitated state; and
initiating a mayday signal that the at least one aircraft crew member has been incapacitated.

17. The method of claim 13, wherein the emergency flight plan is computed using: demotion factors to demote/promote airways; and/or 3-dimensional polygons to represent demoted/hazardous airspace, and/or use of aircraft endurance.

18. The method of claim 13, further comprising:
generating or modifying the emergency flight plan without support from the ground system and controlling the aircraft to implement the emergency flight plan, and/or to allow an authenticated onboard crew member to regain manual control of the aircraft, wherein if an authenticated communications link between the aircraft and the ground system is active then disabling modification of the emergency flight plan, and if the authenticated communications link is lost, then enabling modification of the emergency flight plan.

19. A method for auto-piloting an aircraft, the method comprising:
in response to a lack of response from a crew member, engaging an auto-pilot of the aircraft and disallowing manual control of the aircraft;
generating a plurality of potential destinations for the aircraft;
calculating a score for each of the plurality of potential destinations;
selecting a destination based upon the score;
calculating a first approach route from a current position of the aircraft to the selected destination;
causing the aircraft to select and travel the first approach route;
calculating a second approach route in response to a demotion of at least one section of the first approach route, the second approach route avoiding the demoted at least one section of the first approach route;
causing the aircraft to select and travel the second approach route; and
in response to receiving authentication from the crew member, allowing manual control of the aircraft.

20. The method of claim 19, wherein the score is based on a flying altitude constraint and one or both of a speed restriction and a weather condition, and the demotion of the at least one section of the first approach accounts for a change in the flying altitude constraint, the speed restriction, and/or the weather condition.

\* \* \* \* \*